United States Patent
Chang et al.

(10) Patent No.: US 10,624,326 B1
(45) Date of Patent: Apr. 21, 2020

(54) GEAR SHIFTING DEVICE OF DRUM FISHING REEL

(71) Applicant: OKUMA FISHING TACKLE CO., LTD., Taichung (TW)

(72) Inventors: Liang-Jen Chang, Taichung (TW); Ching-Po Liao, Taichung (TW)

(73) Assignee: OKUMA FISHING TACKLE CO., LTD., Taichung (TW)

( * ) Notice: Subject to any disclaimer, the term of this patent is extended or adjusted under 35 U.S.C. 154(b) by 0 days.

(21) Appl. No.: 16/425,553

(22) Filed: May 29, 2019

(51) Int. Cl.
*A01K 89/01* (2006.01)
*A01K 89/015* (2006.01)

(52) U.S. Cl.
CPC .............................. *A01K 89/01902* (2015.05)

(58) Field of Classification Search
CPC ............ A01K 89/0189; A01K 89/0184; A01K 89/0186; A01K 89/0188
See application file for complete search history.

(56) References Cited

U.S. PATENT DOCUMENTS

| | | | | |
|---|---|---|---|---|
| 4,867,392 A | * | 9/1989 | Sato ................... | A01K 89/0184 242/255 |
| 5,058,447 A | * | 10/1991 | Ikuta ...................... | F16H 3/083 74/371 |
| 5,297,756 A | * | 3/1994 | Ikuta .................... | A01K 89/059 242/270 |
| 6,102,316 A | * | 8/2000 | Nilsen ................. | A01K 89/0184 242/255 |
| 6,113,019 A | * | 9/2000 | Jewell ................ | A01K 89/0184 242/255 |
| 6,325,315 B1 | * | 12/2001 | Chang ................. | A01K 89/0184 242/255 |
| 6,830,208 B2 | * | 12/2004 | Datcuk, Jr. ........ | A01K 89/0193 242/255 |
| 7,793,878 B2 | * | 9/2010 | Kobayashi ......... | A01K 89/0183 242/259 |
| 8,113,456 B2 | * | 2/2012 | Takechi ............. | A01K 89/0192 242/257 |
| 8,534,584 B2 | * | 9/2013 | Hirayama .......... | A01K 89/0193 242/259 |
| 9,307,749 B1 | * | 4/2016 | Alajajyan .......... | A01K 89/0105 |

FOREIGN PATENT DOCUMENTS

TW 419945 U 1/2001

* cited by examiner

*Primary Examiner* — Emmanuel M Marcelo
(74) *Attorney, Agent, or Firm* — Muncy, Geissler, Olds & Lowe, PC

(57) ABSTRACT

A gear shifting device of a drum fishing reel includes first and second gears having first and second through holes respectively, and a gear shaft extending through the first and second through holes and having two through grooves. A shifting rod is provided with two elongated holes and axially moveably inserted into a shaft hole of the gear shaft. A key is inserted through the through grooves and the elongated holes and abutted with a spring disposed inside the shifting rod. When the key is inserted into the first through hole or the second through hole, the first gear or the second gear is rotatably driven by the gear shaft. As such, the key can be positioned positively, the speed changing motion acts smoothly, and the gear shifting device can be easily assembled with stable quality.

7 Claims, 4 Drawing Sheets

GEAR SHIFTING DEVICE OF DRUM FISHING REEL

BACKGROUND OF THE INVENTION

1. Field of the Invention

The present invention relates generally to a drum fishing reel and more particularly, to a gear shifting device of a drum fishing reel.

2. Description of the Related Art

Taiwan Patent No. 419945 discloses a gear shifting device of a conventional drum fishing reel, which is composed of a gear shaft 30, a first gear 31 sleeved onto the outer periphery of the gear shaft 30 for a high speed transmission, a second gear 32 sleeved onto the outer periphery of the gear shaft 30 for a low speed transmission, a shifting rod (press pin) 40 disposed inside the gear shaft 30, a pin member 42 connected to the shifting rod (press pin) 40 by a spring 41, a pin (key) 45 penetrating through the pin member 42 and being engageable with the first gear 31 or the second gear 32. When the pin (key) 45 is engaged with one of the first and second gears 31 and 32, the angler may wind and release the fishing line in a high speed manner or a low speed manner. By means of adjusting the position of the pin (key) 45, the gear shifting device of the fishing reel will be shifted from the high speed mode to the lower speed mode or vice versa.

However, upon manufacture, the length of the spring 41 connecting the shifting rod (press pin) 40 and the pin member 42 is not easy to control. Any manufacturing error of the spring 41 may cause inaccurate positioning of the pin (key) 45. In assembly, no matter the spring 41 is connected between the shifting rod (press pin) 40 and the pin member 42 by screwing connection or other fastening ways, the position of the pin member 42 is liable to offset or even incline due to the manufacturing tolerance thereof, resulting in that the pin (key) 45 cannot be positively and accurately positioned, thereby causing malfunction or unsmoothness in gear shifting. To have uniform quality of products, the manufacturing parameters must be strictly and accurately controlled, resulting in increase of the manufacturing cost. As such, the goal of preventing the aforesaid disadvantages is to be achieved by the manufacturer in this industrial field.

SUMMARY OF THE INVENTION

The present invention has been accomplished in view of the above-noted circumstances. It is an objective of the present invention to provide a gear shifting device of a drum fishing reel, which can positively and accurately position a key in a predetermined position with a smooth gear shifting motion. Another objective of the present invention is to provide a gear shifting device of a drum fishing reel, which can be easily assembled with a good quality stability and reduce the manufacturing cost thereof.

To attain the above objectives, the present invention provides a gear shifting device of a drum fishing reel, which comprises a gear shaft rotatable about an axis, a first gear having a first through hole, through which the gear shaft extends, a second gear parallel arranged by the first gear and provided with a second through hole, through which the gear shaft extends, a shifting rod, a key, and a first resilient member. The gear shaft is provided with a shaft hole and two through grooves communicated with the shaft hole. The shifting rod is provided with a chamber and two elongated holes communicated with the chamber. The shifting rod is inserted into the shaft hole of the gear shaft in a way that the shifting rod is axially moveable relative to the gear shaft between a first position and a second position. The key is inserted through the two through grooves of the gear shaft and the two elongated holes of the shifting rod in a way that the key is moveable along the axis relative to the gear shaft and the shifting rod. The first resilient member is disposed inside the chamber of the shifting rod and abutted against the key. When the shifting rod is located at the first position, the key is inserted into the first through hole of the first gear such that the first gear is driven by the gear shaft to rotate. When the shifting rod is located at the second position, the key is inserted into the second through hole of the second gear such that the second gear is driven by the gear shaft to rotate.

By means of the aforesaid structural features, the gear shifting device of the drum fishing reel can positively and accurately position the key in a smooth gear shifting motion, and can be easily assembled with a good quality stability so as to reduce the manufacturing cost thereof.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
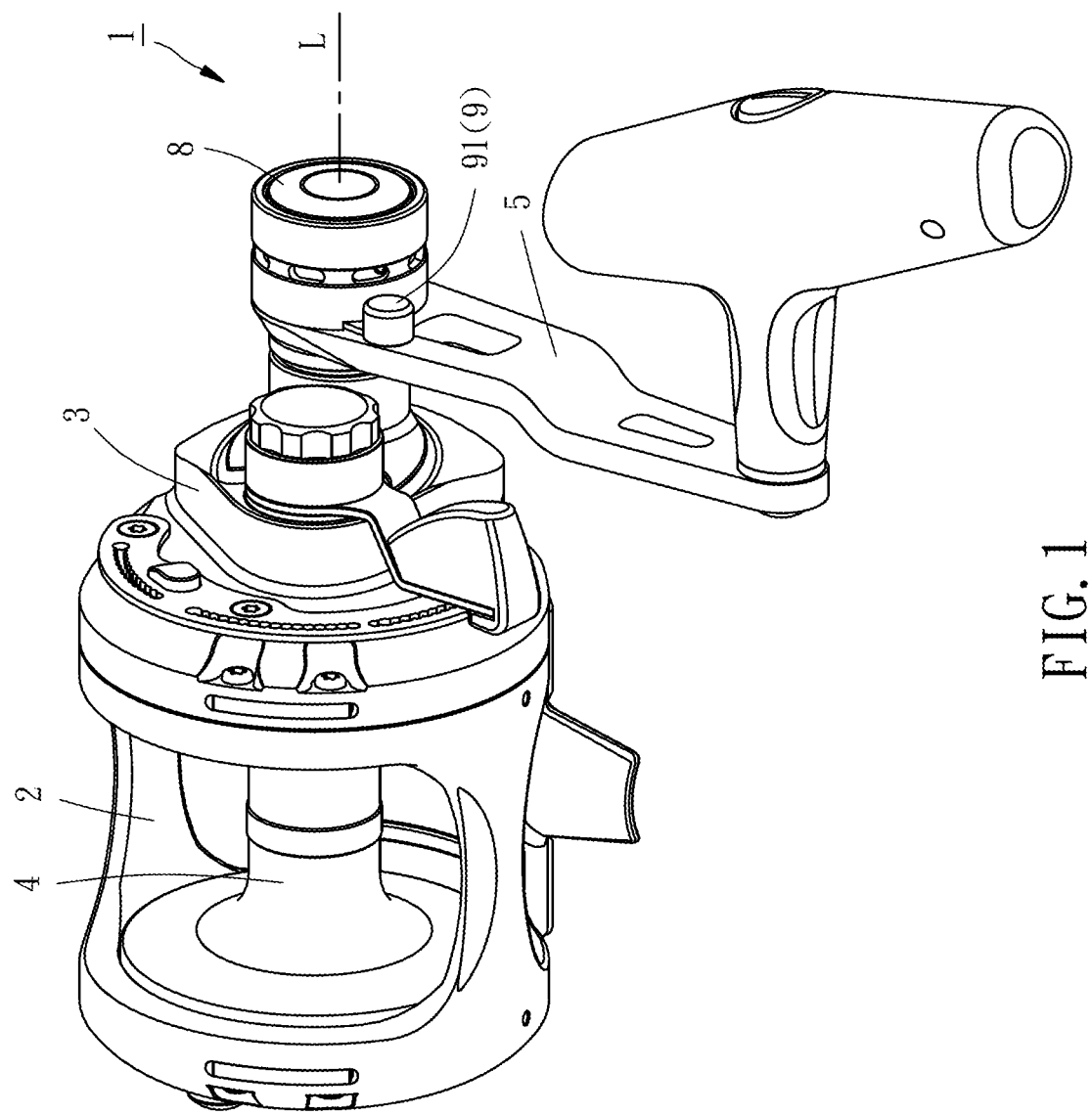
FIG. 1 is a perspective view of a drum fishing reel according to an embodiment of the present invention.
Figure 2:
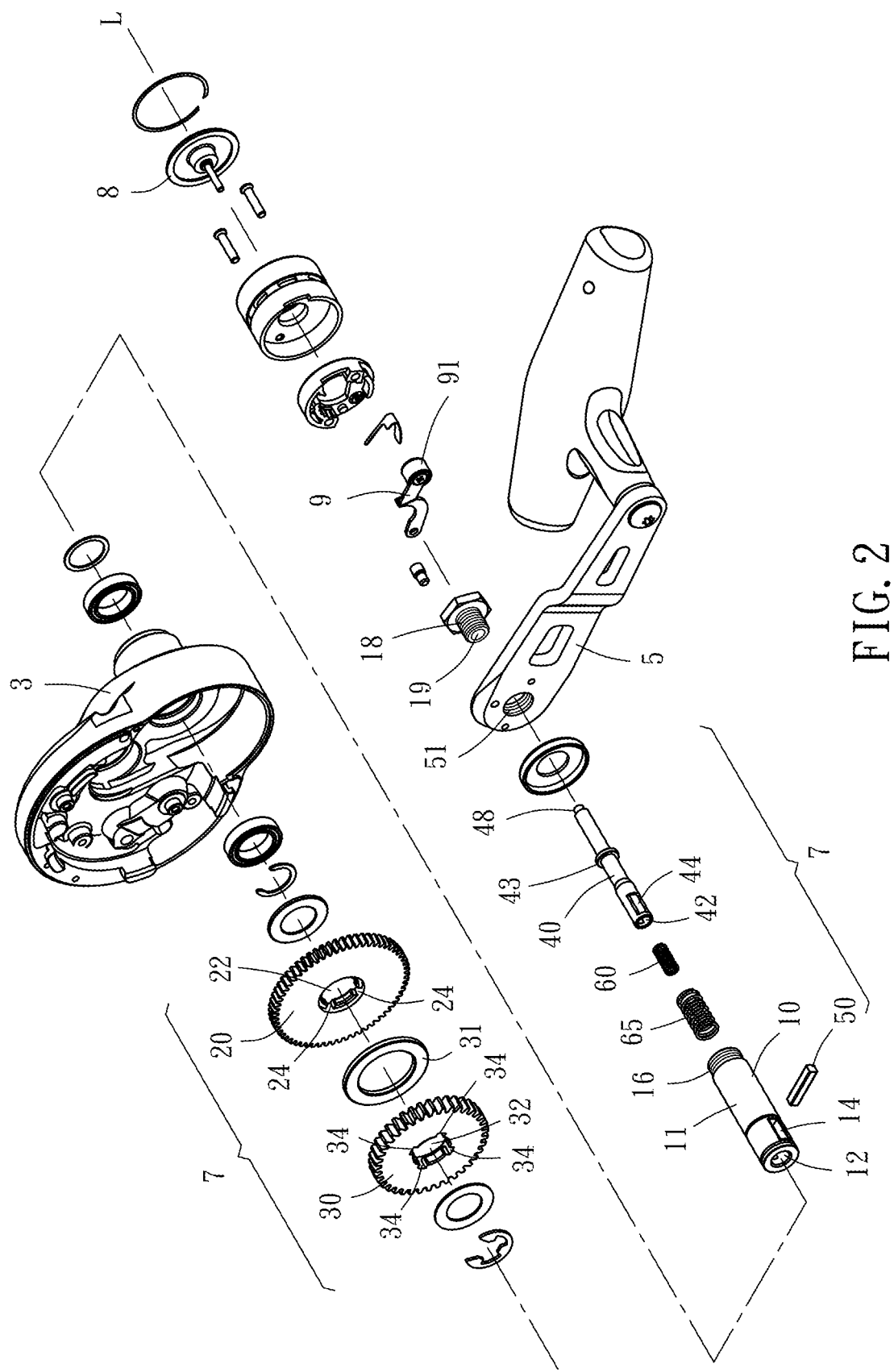
FIG. 2 is an exploded perspective view of a gear shifting device of the drum fishing reel of the embodiment of the present invention.

Hereunder a preferred embodiment will be detailedly described with accompanying drawings for illustrating technical features and structure of the present invention. FIG. 1 is a perspective view of a drum fishing reel, denoted with reference numeral 1, according to an embodiment of the present invention. FIG. 2 is an exploded perspective view of a gear shifting device 7 of the drum fishing reel 1 of the embodiment of the present invention. As shown in FIGS. 1 and 2, the drum fishing reel 1 is composed of a main body 2, a lateral cap 3 covered on a side of the main body 2, a spool 4 rotatably mounted inside the body 2, a handle lever 5 rotatably disposed to the lateral cap 3, and a transmission unit 6 disposed to the lateral cap 3 and connected with the spool 4. As such, the rotational motion of the handle lever 5 can be transmitted to the spool 4 via the transmission unit 6, such the spool 4 can be driven to rotate when an angler rotates the handle lever 5. The transmission unit 6 comprises a gear shifting device 7 for enabling the transmission unit 6 to operate in a high speed mode or a low speed mode. The gear shifting device 7 comprises a gear shaft 10, a first gear 20, a second gear 30, a shifting rod 40, a key 50, a first spring 60, and a second spring 65.

Figure 3:
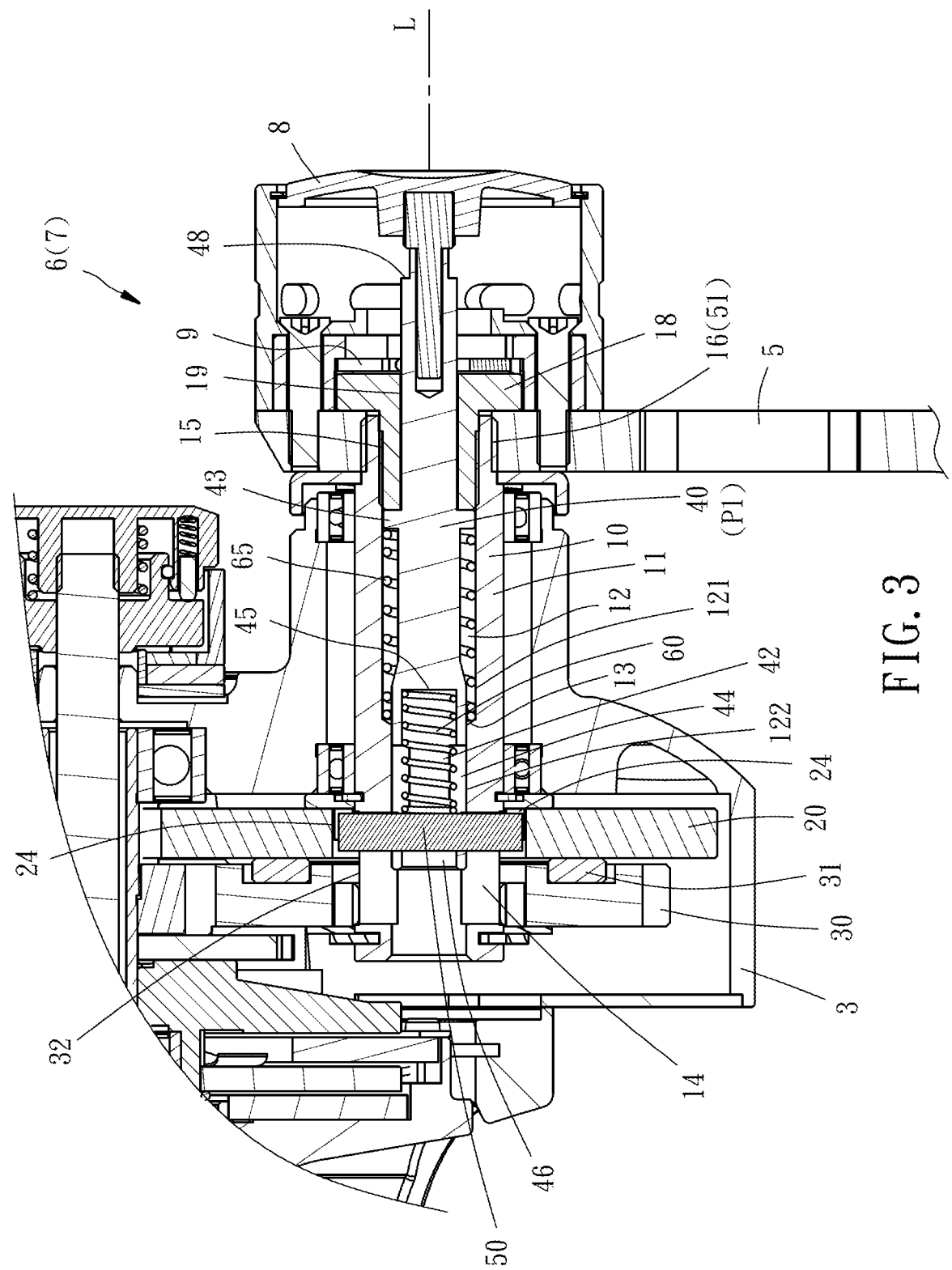
FIG. 3 is a sectional view showing that a key of the gear shifting device of the embodiment of the present invention is located at a first position.

The gear shaft 10 is rotatably inserted through the lateral cap 3 and rotatable about an axis L. The gear shaft 10 includes a tube portion 11, a shaft hole 12 penetrating through the tube portion 11 along the axis L, and two through grooves 14 radially penetrating through the tube portion 11 and arranged face to face. As shown in FIG. 3, the shaft hole 12 includes a stepped portion 13 formed at an inner periphery of the tube portion 11 adjacent to the through grooves 14. The two through grooves 14 each have a rectangular shape extending in a direction parallel to the axis L and are communicated with the shaft hole 12. The gear shaft 10 has an end provided with an internal threaded portion 15 for being screwingly engaged with a bolt 18, and an external threaded portion 16 for being screwingly engaged with a threaded hole 51 at an end of the handle lever 5. The handle lever 5 is restricted by the bolt 18 and connected with the gear shaft 10, such that the handle lever 5, the gear shaft 10 and the bolt 18 are synchronously rotatable about the axis L relative to the lateral cap 3 and are not axially moveable along the axis L relative to the lateral cap 3.

In this embodiment, the shaft hole 12 has two end openings, a big-diameter section 121, a small-diameter section 122, and the stepped portion 13 at the juncture between the big-diameter section 121 and the small-diameter section 122. In another embodiment, the shaft hole 12 may be provided at an end remote from the handle lever 5 with a closed portion and may have a constant diameter. Further, the stepped portion 13 may be formed by a protrusion ring protruding inwardly and radially from the inner periphery of the shaft hole 12 of the tube portion 11 or by a retaining ring fixed to the inner periphery of the shaft hole 12.

The first gear 20 is provided at a center thereof with a first through hole 22, through which the gear shaft 10 is inserted. An outer periphery of the first gear 20 is provided with a plurality of teeth. The first through hole 22 of the first gear 20 has four equiangularly spaced first key ways 24, in which two first key ways 24, which are arranged face to face, form a pair of the first key ways 24.

The second gear 30 is parallelly arranged by the first gear 20 and provided with a second through hole 32, through which the gear shaft 10 is inserted. The diameter of the second gear 30 is smaller than that of the first gear 20, and the number of teeth that are provided at an outer periphery of the second gear 30 is less than that of the teeth of the first gear 20. The second through hole 32 of the second gear 30 has four equiangularly-spaced second key ways 34, in which two second key ways 34, which are arranged face to face, form a pair of the second key ways 34. A wash 31 is provided between the first and second gears 20 and 30 to prevent the first gear 20 from contacting and rubbing the second gear 30.

Figure 4:
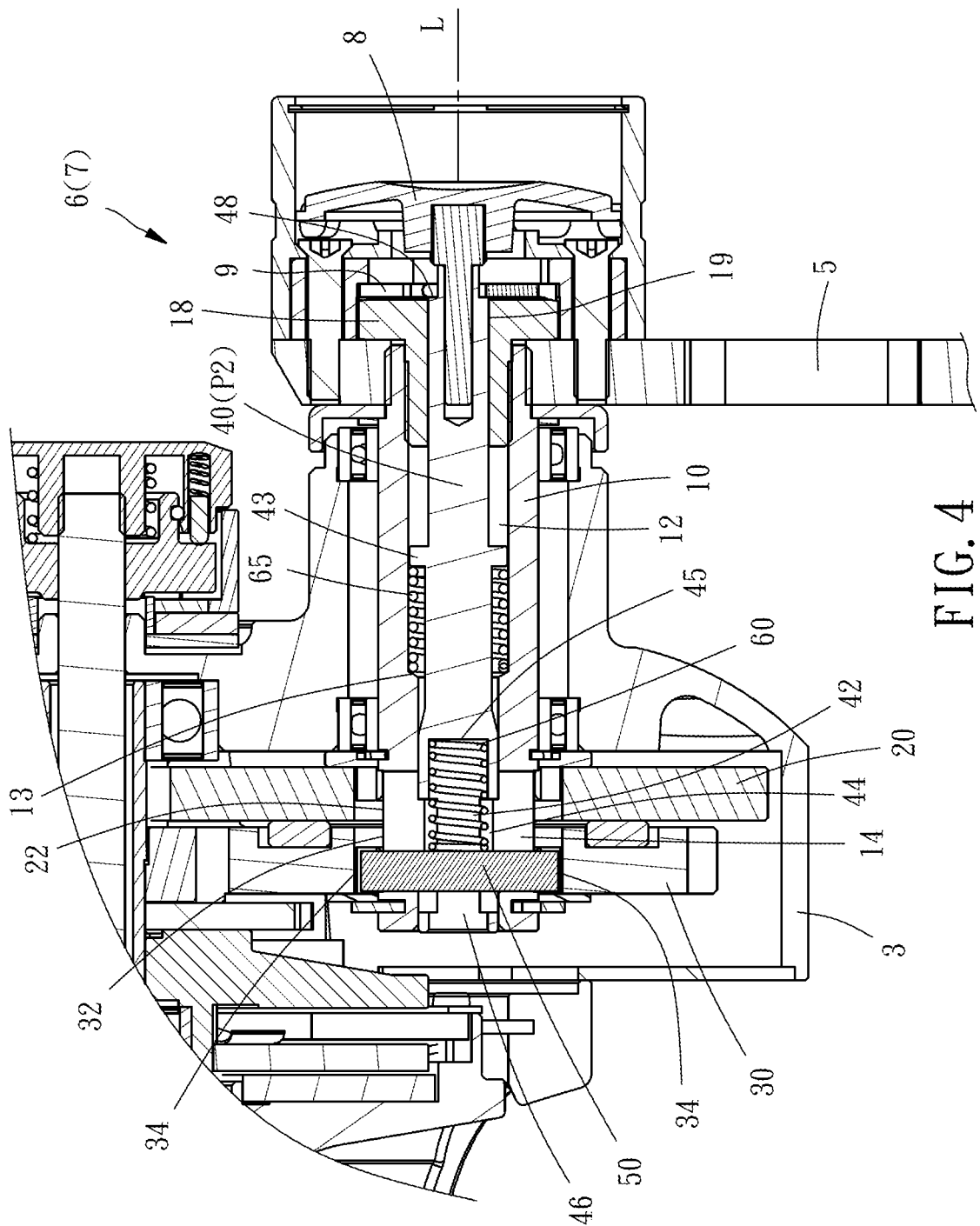
FIG. 4 is another sectional view showing that the key of the gear shifting device of the embodiment of the present invention is located at a second position.

The shifting rod 40 is inserted in the shaft hole 12 of the gear shaft 10 in a way that an end of the shifting rod 40 is inserted through a central hole 19 of the bolt 18 and connected with a push button 8, and the shifting rod 40 is axially moveable relative to the gear shaft 10, i.e. reciprocatingly moveable in a direction parallel to the axis L, between a first position P1, as shown in FIG. 3, and a second position P2, as shown in FIG. 4. The shifting rod 40 is provided with a chamber 42, a radially and outwardly protruded flange 43, and two elongated holes 44 communicated with the chamber 42 and arranged face to face. The chamber 42 of the shifting rod 40 is recessed inwardly and axially from an end of the shifting rod 42 in such a way that the chamber 42 is provided at an end thereof with a bottom portion 45 and at the other end thereof with an opening 46. The flange 43 is located at about a middle of the shifting rod 40, and the two elongated holes 44 of the shifting rod 40 extend in a direction parallel to the axis L. Two ends of each of the elongated holes 44 are closed ends.

The key 50 is inserted through the two through grooves 14 of the gear shaft 10 and the two elongated holes 44 of the shifting rod 40 in a way that two ends of the key 50 extend out of the tube portion 11 of the gear shaft 10 respectively and the key 50 is moveable along the axis L relative to the gear shaft 10 and the shifting rod 40.

The first resilient member 60 is a compression coil spring disposed inside the chamber 42 of the shifting rod 40. Two ends of the first resilient member 60 are respectively abutted against the bottom portion 45 of the chamber 42 and the key 50 in a way that the key 50 is pushed towards the opening 46 and stopped at first ends of the two elongated holes 44 when the key 50 receives no external force.

By means of the above-disclosed structure, when the shifting rod 40 is located at the first position P1 as shown in FIG. 3, the key 50 is inserted into the first through hole 22 of the first gear 20 and engaged with a pair of the first key ways 24, such that the first gear 20 is drivenable by the gear shaft 10 to rotate. When the shifting rod 40 is shifted to the second position P2 as shown in FIG. 4, the key 50 is inserted into the second through hole 32 of the second gear 30 and engaged with a pair of the second key ways 34, such that the second gear 30 is drivenable by the gear shaft 10 to rotate. In this embodiment, the moving stroke of the key 50 is defined by the length of the through grooves 14, and the key 50 can prevent the shifting rod 40 from escape from the gear shaft 10.

The second resilient member 65 is a compression coil spring sleeved onto the shifting rod 40 and located between the stepped portion 13 of the shaft hole 12 and the flange 43 of the shifting rod 40. Two ends of the second resilient member 65 are stopped against the stepped portion 13 and the flange 43 in such a way that when the shifting rod 40 receives no external force, the shifting rod 40 is pushed by the second resilient member 65 towards an outside of the lateral cap 3 until the flange 43 is abutted against an end of the bolt 18, such that the shifting rod 40 is held in the first position P1. In another embodiment, the flange 43 may be formed by a retaining ring fixed to the outer periphery of the shifting rod 40.

It is to be further illustrated that the fishing reel 1 further comprises a retaining piece 9 disposed at an outside of the bolt 18, as shown in FIG. 4. The shifting rod 40 is provided at an end adjacent to the push button 8 with a stepped portion 48. When the shifting rod 40 is located at the second position P2, the retaining piece 9 is radially moveable to engage with the stepped portion 48, such that the shifting rod 40 is held in the second position P2 and won't return to the first position P1 due to the rebounding force of the second resilient member 65. The retaining piece 9 has an outer end 91 operable by a user. When a user slightly pushes the outer end 91 of the retaining piece 9, the retaining piece 9 is released and unlocked from the shifting rod 40, such that the sifting rod 40 will shift from the second position P2 to the first position P1 due to the rebounding force of the second resilient member 65, as shown in FIG. 3.

With the above-mentioned structure, when the shifting rod 40 is positioned at the first position P1 as shown in FIG. 3, the key 50 is engaged with two first key ways 24 of the first through hole 22, such that when the user rotates the handle lever 5, the handle lever 5 can drive the first gear 20 to rotate, thereby enabling the transmission unit 6 to drive the spool 4 to rotate in a high speed mode. To change speed, the user can push the push button 8 with a force in exceed of the rebounding force of the second resilient member 65 so as to force the shifting rod 40 to move from the first position P1 to the second position P2, as shown in FIG. 4. In this status, the key 50 is engaged with two second key ways 34 of the second through hole 32, such that when the user rotates the handle lever 5, the handle lever 5 can drive the second gear 30 to rotate, thereby enabling the transmission unit 6 to drive the spool 4 to rotate in a low speed mode. To shift back to the high speed mode, the only thing that the user needs to do is to slightly push the outer end 91 of the retaining piece 9. It is to be particularly mentioned that in the process that the shifting rod 40 is moving from the first position P1 to the second position P2 and at the moment that the key 50 has not been positively engaged with the second key ways 34, the first resilient member 60 will continuously push the key 50 towards the second gear 30 until the key 50 is engaged with the second key ways 34 as soon as the key 50 is in alignment with the second key ways 34, as shown in FIG. 4. The key 50 is abutted against one end of each of the two through grooves 14 of the gear shaft 10, as shown in FIG. 4. In another aspect, in the process that the shifting rod 40 is moving from the second position P2 back to the first position P1 and at the moment that the key 50 has not been positively engaged with the first key ways 24, the second resilient member 65 will continuously push the shifting rod 40 towards the first position P1 until the key 50 is pulled by the shifting rod 40 to engage with the first key ways 24 as soon as the key 50 is in alignment with the first key ways 24, as shown in FIG. 3. The key 50 is abutted against one of the closed ends of each of the two elongated holes 44 of the shifting rod 40, as shown in FIG. 3. Since the key 50 is restricted in the two elongated holes 44 of the shifting rod 40 and pushed by the first resilient member 60, the key 50 can be abutted against the closed ends of the two elongated holes 44 to be positively and accurately positioned. There will be no offset in position of the key 50 originated from difficult control of manufacturing dimension of the first resilient member 60. As a result, the gear shifting device 7 of the present invention can run smoothly. Further, the gear shifting device 7 of the present invention can be easily assembled with a good quality stability and decrease of the manufacturing cost, thereby achieving the objectives of the present invention.

The invention being thus described, it will be obvious that the same may be varied in many ways. For example, the positions of the first and second gears 20 and 30 can be exchanged with each other, and one pair of first key ways 24 and one pair of second key ways 34 will be sufficient in present invention. Such variations are not to be regarded as a departure from the spirit and scope of the invention, and all such modifications as would be obvious to one skilled in the art are intended to be included within the scope of the following claims.

What is claimed is:

1. A gear shifting device of a drum fishing reel, comprising:

a gear shaft rotatable about an axis and provided with a shaft hole and two through grooves communicated with the shaft hole;

a first gear having a first through hole, through which the gear shaft extends;

a second gear parallelly arranged by the first gear and provided with a second through hole, through which the gear shaft extends;

a shifting rod provided with a chamber and two elongated holes communicated with the chamber, the shifting rod being inserted into the shaft hole of the gear shaft in a way that the shifting rod is axially moveable relative to the gear shaft between a first position and a second position;

a key inserted through the two through grooves of the gear shaft and the two elongated holes of the shifting rod in a way that the key is moveable along the axis relative to the gear shaft and the shifting rod; and a first resilient member disposed inside the chamber of the shifting rod and abutted against the key;

wherein two ends of each of the elongated holes of the shifting rod are closed ends;

wherein when the shifting rod is located at the first position, the key is inserted into the first through hole of the first gear and abutted against one of the closed ends of each of the two elongated holes of the shifting rod such that the first gear is driven by the gear shaft to rotate; when the shifting rod is located at the second position, the key is inserted into the second through hole of the second gear such that the second gear is driven by the gear shaft to rotate.

2. The gear shifting device of the drum fishing reel as claimed in claim 1, wherein the two elongated holes of the shifting rod extend in a direction parallel to the axis.

3. The gear shifting device of the drum fishing reel as claimed in claim 1, wherein the first resilient member is a compression coil spring.

4. The gear shifting device of the drum fishing reel as claimed in claim 1, wherein the chamber of the shifting rod is recessed inwardly and axially from an end of the shifting rod.

5. The gear shifting device of the drum fishing reel as claimed in claim 1, further comprising a second resilient member; the shaft hole of the gear shaft comprises a stepped portion; the shifting rod comprises a radially protruded flange; the second resilient member is sleeved onto the shifting rod and located between the stepped portion and the radially protruded flange.

6. The gear shifting device of the drum fishing reel as claimed in claim 5, wherein the second resilient member is a compression coil spring.

7. The gear shifting device of the drum fishing reel as claimed in claim 1, wherein the key is abutted against one end of each of the two through grooves of the gear shaft while the shifting rod is located at the second position.

* * * * *